US008520933B2

(12) United States Patent
Wang et al.

(10) Patent No.: US 8,520,933 B2
(45) Date of Patent: Aug. 27, 2013

(54) METHOD FOR SEARCHING AND CONSTRUCTING 3D IMAGE DATABASE

(75) Inventors: Sheng-Chuan Wang, Hsinchu (TW); Ann-Shyn Chiang, Hsinchu (TW); Ping-Chang Lee, Hsinchu (TW); Ching-Yao Lin, Hsinchu (TW); Yu-Tai Ching, Hsinchu (TW); Chao-Jun Zhuang, Hsinchu (TW); Hsiu-Ming Chang, Hsinchu (TW); Yung-Chang Chen, Hsinchu (TW); Kuen-Long Tsai, Hsinchu (TW); Chang-Huain Hsieh, Hsinchu (TW)

(73) Assignees: National Tsing Hua University, Hsinchu (TW); National Applied Research Laboratory, Taipei (TW)

( * ) Notice: Subject to any disclaimer, the term of this patent is extended or adjusted under 35 U.S.C. 154(b) by 873 days.

(21) Appl. No.: 12/690,424

(22) Filed: Jan. 20, 2010

(65) Prior Publication Data
US 2010/0284585 A1    Nov. 11, 2010

(30) Foreign Application Priority Data

May 11, 2009    (TW) ................................ 98115595 A

(51) Int. Cl.
  *G06K 9/00*    (2006.01)
(52) U.S. Cl.
  USPC ............ 382/154; 382/128; 382/129; 382/224
(58) Field of Classification Search
  USPC .................. 382/128, 129, 224, 104
  See application file for complete search history.

(56) References Cited

U.S. PATENT DOCUMENTS

| | | | | |
|---|---|---|---|---|
| 6,377,833 | B1* | 4/2002 | Albert | 600/410 |
| 6,472,216 | B1 | 10/2002 | Chiang | |
| 7,054,850 | B2* | 5/2006 | Matsugu | 706/48 |
| 7,286,694 | B2* | 10/2007 | Oosawa | 382/128 |
| 7,406,187 | B2* | 7/2008 | Sato et al. | 382/128 |
| 7,660,437 | B2* | 2/2010 | Breed | 382/104 |
| 8,090,164 | B2* | 1/2012 | Bullitt et al. | 382/128 |
| 2002/0038294 | A1* | 3/2002 | Matsugu | 706/20 |
| 2008/0292194 | A1* | 11/2008 | Schmidt et al. | 382/217 |
| 2009/0140887 | A1* | 6/2009 | Breed et al. | 340/990 |
| 2009/0274375 | A1* | 11/2009 | Kavanau et al. | 382/224 |
| 2009/0287624 | A1* | 11/2009 | Rouat et al. | 706/20 |

OTHER PUBLICATIONS

J. Douglas Armstrong et al., Towards a virtual fly brain, Phil. Trans. R. Soc. A 2009, 367, 2387-2397.
Cheng-Chi Wu et al., Algorithm for the Creation of the Standard Drosophila Brain Model and its Coordinate System, National Tsing Hua University, 478-483, Jul. 29, 2008-Aug. 1, 2008.
Ping-Chang Lee et al., A Semi-Automatic Method for Neuron Centerline Extraction in Confocal Microscopic Image Stack, 959-962, May 14-17, 2008.

* cited by examiner

*Primary Examiner* — Vu Le
*Assistant Examiner* — Aklilu Woldemariam
(74) *Attorney, Agent, or Firm* — WPAT, P.C.; Anthony King

(57) ABSTRACT

The present invention relates to methods for searching and constructing a 3D motif image database, wherein said 3D motif image database can be used to understand the connection relationship of a 3D network, e.g. a neural network comprising biological neural networks or artificial neural networks. The searching and constructing methods are applied on the 3D motif image database, a proper computer-aided graphic platform. The database not only facilitates the management of the huge amount of categorized data but also rationally excavates the hidden information cloaked within.

22 Claims, 7 Drawing Sheets

US 8,520,933 B2

METHOD FOR SEARCHING AND CONSTRUCTING 3D IMAGE DATABASE

FIELD OF THE INVENTION

The present invention relates to a method for query and construction of a three-dimensional (3D) image database.

BACKGROUND OF THE INVENTION

Research in brain function may be roughly divided into various levels (from microscopic to macroscopic), e.g. gene expressions, protein biochemical reactions, neuronal functions, brain neural network organizations and animal behavior. Molecular biology, flourished since the 1960s, allows genetic manipulation to reflect biological functions at different scales. In such ways, researchers can now make use of technology to identify Drosophila memory genes of olfaction and memory and alter these genes to influence its behavior. Although scientists have a clear understanding of macro-scale biology such as animal behavior and micro-scale biology such as gene expression and perspectives of biology, micro-meso-scale biological research remains under-studied owing to technical limitations which including the difficulty to acquire the 3D structure of nerve cells and cerebral neural networks. Now, the integration of biofluorescent labeling and optical section scanning in confocal microscopy gives rise to the possibility of high-resolution digital images of the brain and its neural network.

Biologists often can not obtain images (information) of an organism's internal structure without damaging the organism itself. Furthermore, when acquiring biological images, physical limitations of laboratory equipment could only generate a serial of two-dimensional (2D) images instead of three dimensional images; as a result, the spatial information between organs is not immediately made available. While an invention in 2002, U.S. Pat. No. 6,472,216 presents a sample preparation solution which enables scientists to acquire images from a transparent whole mount samples.

Owing to the technological advances in the twentieth century, it is generally accepted that a completely modular brain model can depict its functional reality. Therefore, the interpretation of brain function can be analytically and anatomically described based on the interactions among different brain regions or even neurons. Accordingly, 3D image reconstruction technology can be exploited to build models of major compartments of the brain, and at the same time, merge the anatomy of neuropils or neurons with the function of neural networks in the brain.

Neuropil is a region between neuronal cell bodies in the gray matter of the brain and spinal cord (i.e. the central nervous system). It consists of a dense tangle of axon terminals, dendrites and glial cell processes. It is where synaptic connections are formed between branches of axons and dendrites.

Although the information processing and transmission of the human brain fascinates scientists the most, the fact that the human brain has 100 billion neurons, plus human's relatively longer life span and genes that cannot be manipulated at will, has limited neuroscience research on human brain structures at the cellular level. Scientists thus turn their investigation to other organisms, e.g. mice, zebrafish and Drosophila. For instance, the Drosophila brain only has about 135,000 neurons, but can still exhibit complex memory and learning behaviors; consequently, it has become one of the most popular and important research targets in neuroscience. In addition, Drosophila genes have been entirely sequenced, and its short life cycle (approximately 60 days) further makes it a valuable research target. The knowledge obtained from studies of neural networks in Drosophila may be extended to systems with much more complexities such as human brains (Armstrong, JD and Van Hemert JI, 2009 Towards a virtual fly brain Phil. Trans. R. Soc. A 367, 2387-2397).

SUMMARY OF THE INVENTION

The purpose of the present invention is to disclose methods for searching and constructing a 3D motif image database, wherein said 3D motif image database can be used to understand the connection relationship of a 3D network, e.g. a neural network.

Said motif image here indicates complicated 3D network configurations similar to a neural network; it may also be in open or closed spaces, ranging from ocean to micro-chip, and representing information communications and exchanges within 3D space.

The 3D image database, a proper computer-aided graphic platform, will not only facilitate the management of the huge amount of categorized data but also rationally excavate the hidden information cloaked within.

The "neural network" of the present invention indicates both biological neural networks and artificial neural networks.

Biological neural networks are made up of real biological neurons that are connected or functionally related in the peripheral nervous system or the central nervous system. In the present invention, they are identified as group of neurons or neuropils that perform specific physiological functions in 3D space. "Neuropil" here indicates the region between neuronal cell bodies in the gray matter of the brain or spinal cord (i.e. the central nervous system). It consists of a dense tangle of axon terminals, dendrites and glial cell processes. It is where synaptic connections are formed between branches of axons and dendrites.

Artificial neural networks are made up of interconnecting artificial neurons (programming constructs that mimic the properties of biological neurons). Artificial neural networks may either be used to gain an understanding of biological neural networks, or for solving artificial intelligence problems without necessarily creating a model of a real biological system, i.e. artificial neuron networks can be applied to manipulate complicated geographical networks like traffic roots or electrical circuits, or further applied in manipulating relevant logical interconnections of nodes.

The present invention provides a method for constructing a 3D motif image database comprising the following steps:

1. Providing more than one 3D network motif image, e.g. different sets of Drosophila neuron images constructed from micro-imaging.

The aforementioned neuronal image is obtained from micro-imaging devices, comprising a charged particle scanning microscope, laser scanning microscope, confocal microscope or a fluorescent microscope. A neuronal image comprises at least one complete neuron, i.e. a neuron with a soma, axon, dendrites or a partial complete neuron. The source of the neuronal images comes from both male and female Drosophila of different maturity.

2. Aligning and correcting 3D images generated in the first step according to a 3D standardized coordinate, wherein each coordinate point registered to the 3D images is assigned a coordinate location (x, y, z) to indicate its position in the standardized space area.

3. Dividing 3D images in the second step with individual voxel or a self-defined brick consisting various voxels, wherein voxel is a volume element, representing 1×1×1 unit volume on a regular grid in the standardized space area.

4. Categorizing space information of each coordinate point registered to the 3D images within voxels. Space information comprises the location of said voxel and the ID number of motif images passing through that particular voxel unit.

Said 3D network motif images can be further processed using path tracing algorithm to present in skeletal form.

Path tracing algorithm refers to the selection of any given two points from said image and based on the image outline between these points to calculate the curve length s with the following formula:

$$E(C) = \int_\Omega \{\alpha \|C'(S)\|^2 + \beta \|C''(S)\| + \lambda P(C(s))\} ds$$

where $\alpha, \beta, \lambda$ denote constant positive real numbers; C (s) represents the curve outline of said image; L in $\Omega$=[0, L] denotes the length of the curve outline; P (C (s)) represents the potential used to capture the desirable image feature; E(c) indicates the optimal area of the image outline determined based on the brightness of image selected by best energy equation.

The best energy equation refers to a minimum energy action map which is built using the following function:

$$U_{Po}(P) = \inf_{A_{PoP}} E(C) = \inf_{A_{PoP}} \left\{ \int_\Omega \tilde{P}(C(s)) ds \right\}$$

where $U_{Po}$ (P) is defined as the minimum energy of the path between a point Po and P in the image. $Ap_op$ denotes the set of all paths between points Po and P. When the minimum energy action map is built, the shortest path between Po and P is obtained.

5. Storing processed 3D network motif images in the third step and space information in the forth step into a computer-readable recording medium, where the gray level intensity value of the voxel is above threshold. Said computer-readable recording medium comprises a magnetic storage device, an optical storage device, or an electronic storage device that can be on a PC or a remote device connected via a transmission system.

Said database comprises the spatial information and files of 3D neural images of Drosophila, information regarding neurons of Drosophila, the calculation results, the records of the calculation results and relevant files. Information regarding brain neuronal images of Drosophila, the calculation results, and the records are stored in a corresponding manner, i.e. storing the linkage of neuron names and their spatial points or the linkage of the spatial points and the neurons passing through those points.

The present invention also provides a query method for 3D motif image database comprising the following steps:

1. Providing a 3D network motif image database and constructing an interactive query interface for users. The database comprises 3D neuronal images of Drosophila and their spatial information.

The query interface provides at least one visualization interface and at least one search field which automatically identifies the database as demanded by the user for data search once the user initiates a search command; the resulting image information meeting the search criteria can be presented in dot-matrices, or 3D structure display together with texts on the visualization interface.

The visualization interface displays the neurons/neuropils in 3D and allows operations such as rotation and zooming from different angles to facilitate multi-angle observation. The visualization interface can also display the neural images using semi-transparent effect to illustrate numerous network motif images simultaneously on the visualization interface.

For real-time observation, the 3D images, e.g. nerve fibers of neuronal image, can be simplified into skeletal form using path tracing algorithm. Visualization interface comprises a computer screen, a 3D or non-3D multi-media display and an exhibition space or flat surface for 3D or non-3D projection.

2. Users may select, using the query interface, at least one spatial region or enter at least one search string to search for corresponding image information meeting the query criteria in database as follows:

I. Users select at least one spatial region or enter at least one search string in the query interface. Spatial region comprises at least one 3D rectangular object or at least one branch path or a Boolean combination of the aforementioned two regions. The path selection refers to the users' selecting at least one 3D network motif image with the query interface and from this image to connect at least two extends paths or network motif images.

In a preferred embodiment, the aforesaid network motif image refers to the neuronal image. The search string comprises at least one target neuron name or at least one neuronal image source or a Boolean operation combining the commands of the above.

II. The spatial region search allows the identification of spatial links between the target 3D network motifs and other 3D network motifs; or the detection of any 3D network motif, e.g. neurons passing through a target region.

III. Using the search criteria in the previous step together with binary Boolean (AND, OR, NOT) operations, users can perform more complicated conditional query, e.g. 3D network motif (e.g. neurons) passing through space A and B, but not space C. Boolean commands include AND, OR, NOT. For instance, "(A AND B) NOT C" will search network motifs (e.g. neurons) passing only through spaces A and B, but not space C. Spatial relationship can be obtained using space intersection command (INTERSECT), e.g. "A INTERSCET BOX [1]" finds the neurons passing through both of space A and spatial rectangle region [1].

3. The image information of the corresponding search criteria are presented in text lists, dot-matrices or 3D images on the query interface. The image information of the corresponding search criteria refers to network (e.g. neuron) name, characteristics of network (e.g. neuron) image and 3D network (e.g. neuron) images.

Network characteristic refers to the source of the network image and the dot-matrix density map. The dot-matrix density map represents the number of terminals of neuron path tracing graph in each unit space. Gray-scale dot-matrix can be used to represent the aforesaid level of density for the prediction of network (e.g. neural) hubs which indicate the aggregation of different nerve synapses. The image information of the corresponding query criteria refers to the network (e.g. neuron) name, characteristics of network (e.g. neuron) image and 3D network (e.g. neuron) images passing through a selected path.

The query method further refers to using image information of the corresponding search criteria to find similar image information in the database and display the results on the query interface. Similar image information comprises the information of network (e.g. neuronal) images from the same origin organisms or from proximate space point locations of the original image in the corresponding search criteria.

DETAILED DESCRIPTION OF THE INVENTION

Please refer to the following figures and descriptions for embodiment of the present invention. The invention may be embodied in a variety of forms and should not be inferred to be limited by the examples given in the text.

The present invention relates to a method for query and construction of a 3D image database. A preferred embodiment is a Drosophila 3D neuronal image database.

EXAMPLE 1

Generating 3D Images

The 3D image was generated by inputting Drosophila neuronal image obtained from micro-imaging device. Said image was acquired from a fluorescent-labeled specimen scanned by a laser scanning microscope. During the scanning process, at least part of the sample was scanned by laser. The cross-section of different depths of the sample was scanned in accordance with a predetermined order; the resulting scanned images were numerous plane images at different depths. Images from different slices of the same stack were combined to form a complete image; and then the resulting 3D image consisting of different cross-sections was generated by computer software such as AVIZO (Visualizaiton Science Group, Merignac Cedex, France).

EXAMPLE 2

Constructing 3D Image Database

1. Aligning 3D Images to a Standard Coordinate

The 3D images generated from image processor programs, such as AVIZO, were aligned to a standard coordinate. The alignment correction on 3D images made different image sets to have common space coordinates.

In a preferred embodiment, the standardized coordinate was generated by demarcating a standard Drosophila brain space according to Cartesian axis x, y and z. (Wu, C. C. et al. 2008 Algorithm for the creation of the standard Drosophila brain model and its coordinate system. 5th International Conference on Visual Information Engineering VIE, Xi'an, China, pp. 478-483).

After aligning to the standardized coordinate, each raw 3D image was corrected to fit the standardized coordinate. As a result, each voxel of the 3D image would designate a point location (X,Y,Z). The spatial and intensity information of the voxel (with gray level intensity value above threshold) of 3D images was then stored in a computer—readable recording medium.

The sketch of neurons in the 3D image contained points within the range from (x1, y1, z1) to (x2,y2,z2), while the point locations indicated the space distribution of neurons in the Drosophila brain space.

The information of 3D images was stored in a table form. Referring to table 1 and FIG. 6, the neuronal information table included the ID number of neurons (first column,"I"), the type of neurons (second column, "Type"), location of start point of neurons ($3^{rd}$-$5^{th}$ columns, "Sx,Sy,Sz"), location of end point of neurons ($6^{th}$-$8^{th}$ columns, "Ex,Ey,Ez") and the filenames of the 3D image. The type of neurons included the gender of the origin organism that donated the neuron image (male or female), the function of neuron or any other biological characters which distinguish neuron images from one another.

TABLE 1

| Neuronal information table | | | | | | | | |
|---|---|---|---|---|---|---|---|---|
| I | Type | Sx | Sy | Sz | Ex | Ey | Ez | Filename |
| 1 | ... | ... | ... | ... | ... | ... | ... | ... |
| 2 | ... | ... | ... | ... | ... | ... | ... | ... |
| 3 | ... | ... | ... | ... | ... | ... | ... | ... |
| 4 | ... | ... | ... | ... | ... | ... | ... | ... |
| 5 | Np | 10 | 10 | 10 | 20 | 20 | 20 | Mb |

2. Dividing 3D Images with Voxels

The 3D image was aligned and corrected by dividing with voxels or self-defined bricks, which contain more than one voxels. Each individual voxel was of 1×1×1 unit volume, representing a value of a spatial location in a regular grid of three-dimensional space.

After divided by voxels, all image data was searched to find neurons or neuropils which pass through each individual voxel, The ID number of passing neurons or neuropils was recorded, and the information was concluded in a 3D space table. Referring to table 2, wherein "X", "Y" and "Z" indicated the voxel locations (X,Y,Z) of 3D space, "V" indicated the ID number of neurons or neuropils passing through this particular voxel. Table 2 illustrated a neuron of ID number 12 passing through voxel (0,0,0), a neuron of ID number 1 passing through voxel (0,0,1) and voxel (0,0,2), and a neuron of ID number 5 passing through voxel (0,0,3).

TABLE 2

| 3D space table | | | |
|---|---|---|---|
| X | Y | Z | V |
| 0 | 0 | 0 | 12 |
| 0 | 0 | 1 | 1 |
| 0 | 0 | 2 | 1 |
| 0 | 0 | 3 | 5 |
| ... | ... | ... | ... |

3. Storing 3D Image into Database

The 3D images, neuronal information table and the 3D space table were stored in a computer-readable recording medium, e.g. magnetic storage devices such as disks, tapes, or optical storage devices such as CD-ROM or electronic storage devices such as flash drives. Such storage devices could be located in a local computer or a remote device connected via a transmission system.

In a preferred embodiment, the 3D images are neuronal images from different fruit flies. The source of the neuronal images comes from both male and female Drosophila of different maturity.

4. Simplifying Neuronal Images

Once the 3D neural images were loaded into computer, path tracing algorithm was utilized to obtain skeletal structures of the neural network (P. C. Lee, Y. T. Ching, H. M. Chang and A. S. Chiang. A Semi-automatic Method for Neuron Centerline Extraction in Confocal Microscopic Image Stack. *IEEE 5th International Symposium on Biomedical Imaging From Nano to Macro* 2008:p 959-962). By transforming neuron images into skeleton structures, the time required for visualization and interaction was significantly reduced (FIG. 1-4).

4.1 Path Tracing Algorithm

The minimal path technique captured the global minimum curve of a contour depending on the energy between two given points. The well-known snake model simultaneously considered the smoothness of curve and the potential term, which was determined by the image features in the energy function.

The function was shown below:

$$E(C) = \int_\Omega \{\alpha\|C'(S)\|^2 + \beta\|C''(S)\| + \lambda P(C(s))\}ds$$

where $\alpha$, $\beta$, $\lambda$ were real positive constants, $C(s) \in \mathbb{R}^n$ represented the curve outline of the neural image, $\Omega=[0, L]$ is its domain of definition where L was the length of the curve, C' (s) and C''(s) were the first and second derivatives with respect to s and P(C(s)) represented the optimal area of the neuron image outline determined based on the brightness of neural images selected using the best energy equation.

When the outline was simplified into a curve, s represented the curve length; w denoted a real positive constant that controlled the smoothness of the outline. The simplified formula was as follows:

$$E(C) = \int_\Omega \{\omega + \lambda P(C(s))\}ds = \int_\Omega \tilde{P}(C)ds$$

or written as $\tilde{P}=\omega+\lambda P$.

Given a potential P>0 that was defined to be small when the outline of the neural image was close to the optimal area. The objective of minimal path technique was to look for a path connecting a given pair of points such that the integral of $\tilde{P}=\omega+\lambda P$ was minimum. Therefore, when selecting the shortest path of any two given points of the neural image, $\tilde{P}=\omega+\lambda P$ was the minimum.

4.2 Deciding the Shortest Path Between Two Given Points of the Neuronal Image

A minimum energy action map was built using the following function:

$$U_{Po}(P) = \inf_{A P o P} E(C) = \inf_{A P o P} \left\{ \int_\Omega \tilde{P}(C(s))ds \right\}$$

where $U_{Po}$ (P) was defined as the minimum energy of the path between a point Po and P in the image. $Ap_op$ denoted the set of all paths between points Po and P. When the minimum energy action map was built (as aforementioned), the shortest path between Po and P was obtained.

EXAMPLE 3

Searching 3D Image Database

The present invention provided a method for query of neuronal image database. A preferred embodiment was an interactive method for searching a 3D brain neuronal image database of Drosophila.

The database in the present invention stored the information of connectivity relationships between the brain neuronal networks of Drosophila. Users can query the database through a 3D interactive interface. In this database, users could query the neuronal transmission paths of neuronal signal stimulated by the binding of olfactory receptors with certain molecules. The results showed the information regarding neural transmission paths to olfactory glomeruli, and users could further query which site of mushroom body was the recipient of the stimulated signal.

FIG. 5 illustrated system architecture for interactive search of the 3D image database. The said interactive search device 10 was linked via the internet 60 for data transmission, and automatically searched for information in the database 50. The remote server 51 and query interface 20 were linked via the Internet 60, which received the query commands from user interface 30 and visualization interface 40. The user interface 30 comprised a search command field 31, a 3D picking interface 32 and a file upload field 33.

Visualization interface could display neuronal images in three-dimension form, while further provides users to rotate and zoom in and/or out the 3D images at any desire angles for panoramic view. To avoid nerves shadowing with one other, the neuronal images could be presented in a semi-transparent format for enhanced visualization. 3D images could also be presented in stereoscopic style, which users could perceive realistic depth perception through stereoscopic projection devices. (FIG. 3)

The 3D query interface provided users the capability to select the target neuron/neuropils directly from 3D scene instead of finding the desire target from a very long name list. Please refer to FIG. 4, here presents an innervation-query interface, which enables users to build paths of neuron innervations step-by-step. Users may start from one neuron/neuropil and find out the connections of said neuron/neuropil with other neurons/neuropils. The figure illustrates two neurons (DVGLUT-F-000029, lemon yellow and DVGLUT-F-0000189, orange) innervating the mushroom body (MB_r, maroon). DVGLUT-F-000029 neuron is found to connect to a selected box, which occupies the space belonging to another neuropil-optic tubercle (OpTu_1, green). A third neuron (DVGLUT-F-000134, red) is found with its terminals innervating OpTu_l from the right side. A third neuropil (Lob_l, blue) is found to connect with DVGLUT-F-000134 neuron through its nerve terminals. A column on the left of the visualization interface shows part of neurons also innervating Lob__1.

To expedite the image display, 3D neuronal network images were all presented in skeletal forms. Interactive query referred to users inputting search commands through user interface, connecting to a remote server, and searching for information stored in a remote server database. Search results were then send back to user and presented on the visualization interface, and users could modify search commands according to the results presented on the interface to re-search the database for refined results. (FIGS. 1 and 2)

Query methods were divided into single query and combinational-query as follows:

1. Single query, i.e. using single command, comprised the following:
   a. Query by name, which can be neuron's name or neuropil's name.
   b. Query by ROI Box: search particular neurons/neuropils passing through a certain rectangular space.
   c. Inside BOX Query: search particular neurons/neuropils within a certain rectangular space.
   d. Query by Data: users provide unknown novel neuron image for database search to find the most similar neuron.
2. Combinational-query: using single query coupled with combinations of Boolean operations (AND, OR, NOT) for more advanced search. Combinational-query contains following applications:
   a. En Route Query: selecting two unlinked spatial locations or neurons, and trying to find a third party location or neuron to connect these two. For example: selecting areas A, B and C, and using query commands of A and C En Route B to make use of B as the connection hub between A and C.

b. Spatial Query: selecting at least one adjustable spatial ROI box in the user interface to search neurons or neuropils passing through or within these spaces.

c. Across Query: users could further filter the search results after Boolean or spatial search by selecting a particular spatial ROI box in a designated space to search for neurons passing through the target space and then displayed the results on screen.

d. 3D Innervations Query: use 3D picking interface to select a neuron, neural terminal of a neuron, or neuropil as starting point to search for all connecting nerves in 3D space, in which the results can be presented on the visualization interface. Selecting another neuron, neural terminal of the neuron, or neuropil of interest from the previous query result as the next query target and the system would automatically display all innervations linking the second starting point (neuron, neural terminal, or neuropil); the information table of the innervations could also be displayed on the visualization interface. Repeating the above steps to find the information regarding a series of innervations, where the said information can be the names of neuron or terminals, or terminal of specific neuron.

EXAMPLE 4

Predicting the 3D Network Hub

FIG. 7 displayed the 3D neuron distribution in gray-scale dot matrix to represent the neural terminal density in 3D space. The spatial location with more gray-scale dots implied denser aggregation of nerve synapses, which infers the area is a neural network hub (neuropil), i.e. an area with more frequent neural signal transmissions. As displayed in this figure, the external outline of the Drosophila brain was observable, suggesting the dot matrix is indeed correlated with neural network functions.

Figure 1:
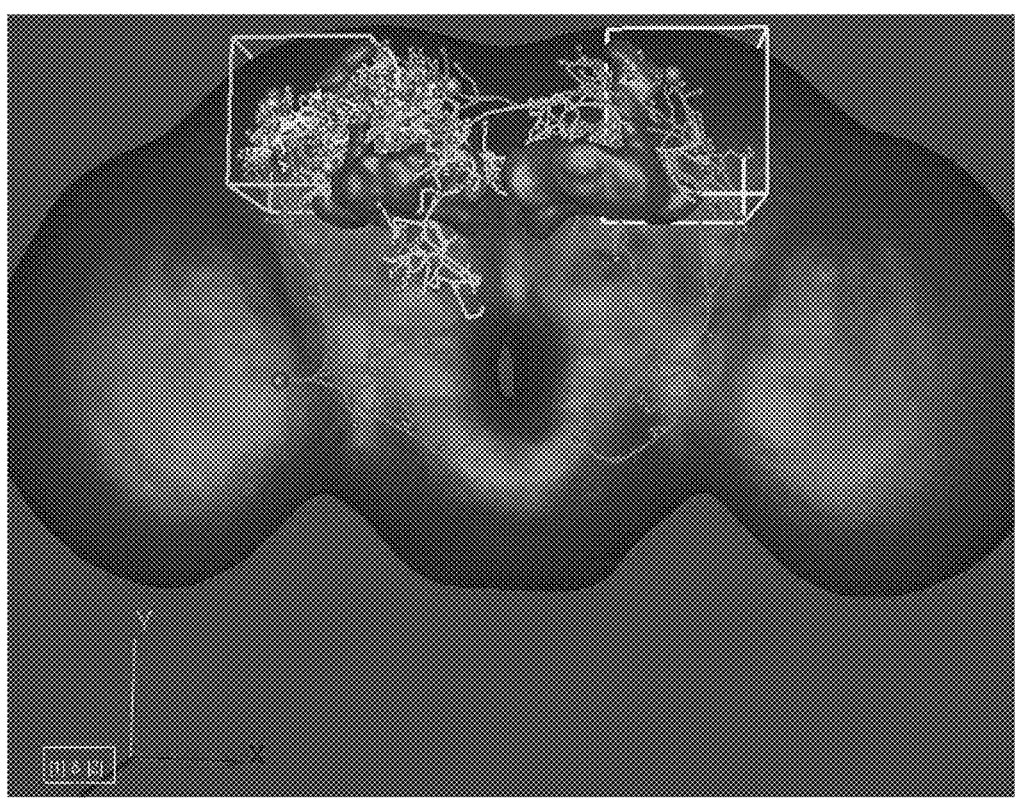
FIG. 1 is a visualization interface of the Drosophila 3D neural image database, which is able to visually present any compartments and details within Drosophila's brain, e.g. special structures like the mushroom body neuropils in mesh-form (brown color parts at the top of the brain), as well as drawing any geometric shapes (e.g. boxes). The small balls denote the nerve terminals, and the large balls represent the nerve soma (also known as the cell body of neuron).
Figure 2:
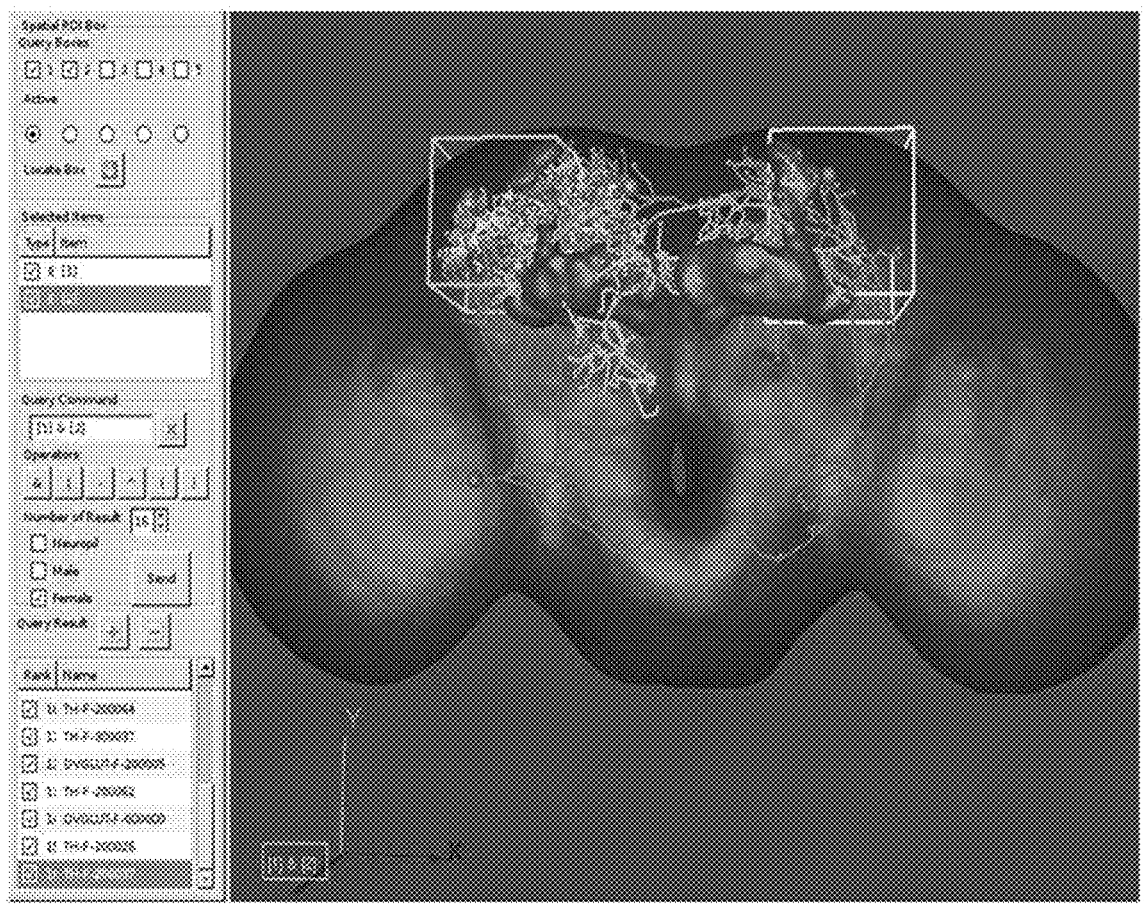
FIG. 2 is a query interface and visualization interface of the Drosophila 3D neural image database. With the use of this interface, users can select neurons of interest from desired spatial regions in the 3D space. This figure selects parts of the female Drosophila brain neurons passing through boxes 1 and 2. The outcome of the search in database is displayed in the Query Result panel at the bottom of the query interface. Users can move said boxes around or adjust their sizes (turned into cuboids) at their preference.
Figure 3:
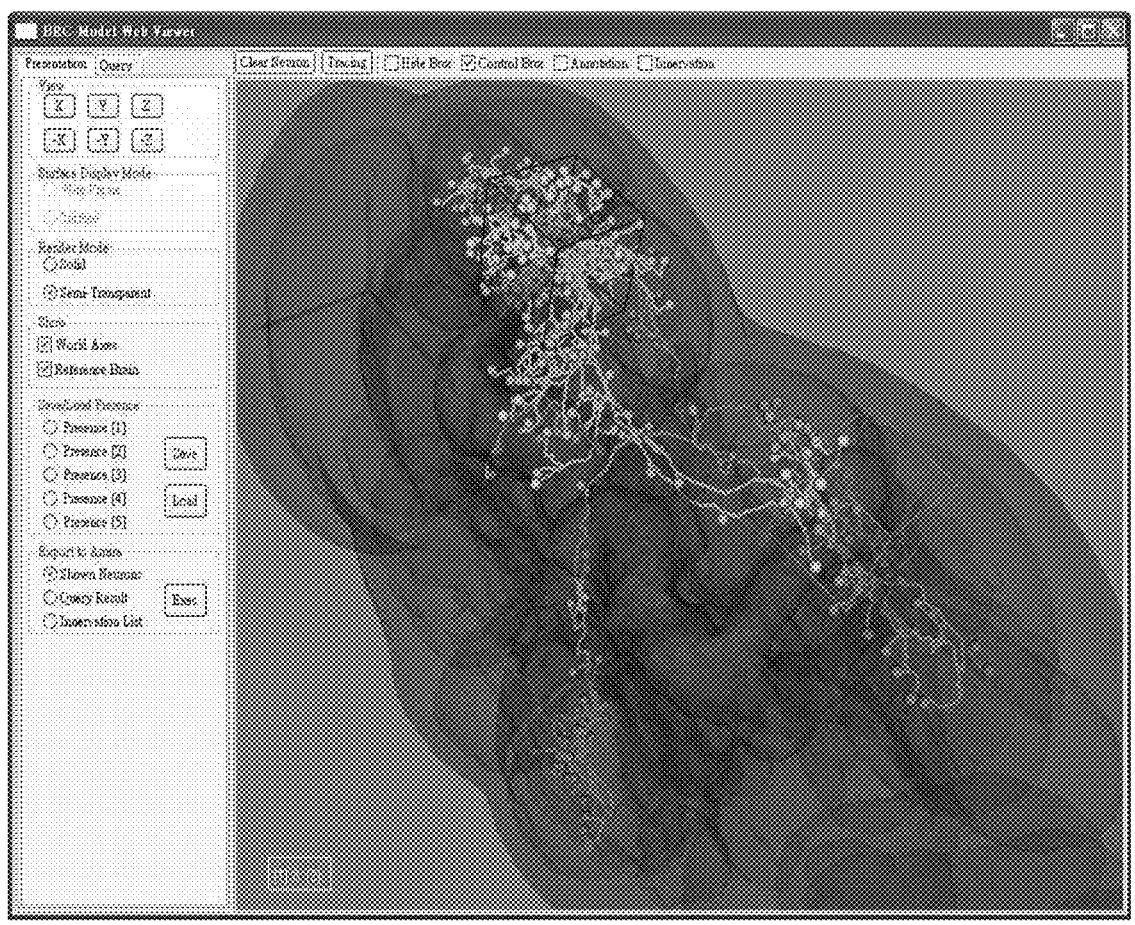
FIG. 3 shows the query interface of the Drosophila 3D neuronal image database and visualization interface. The objects in the scene can be rotated in 3D space at will by users for observation from different viewpoints. This figure is presented in semi-transparent form, permitting the view of numerous groups of neuronal paths/neuropils in need of investigation.
Figure 4:
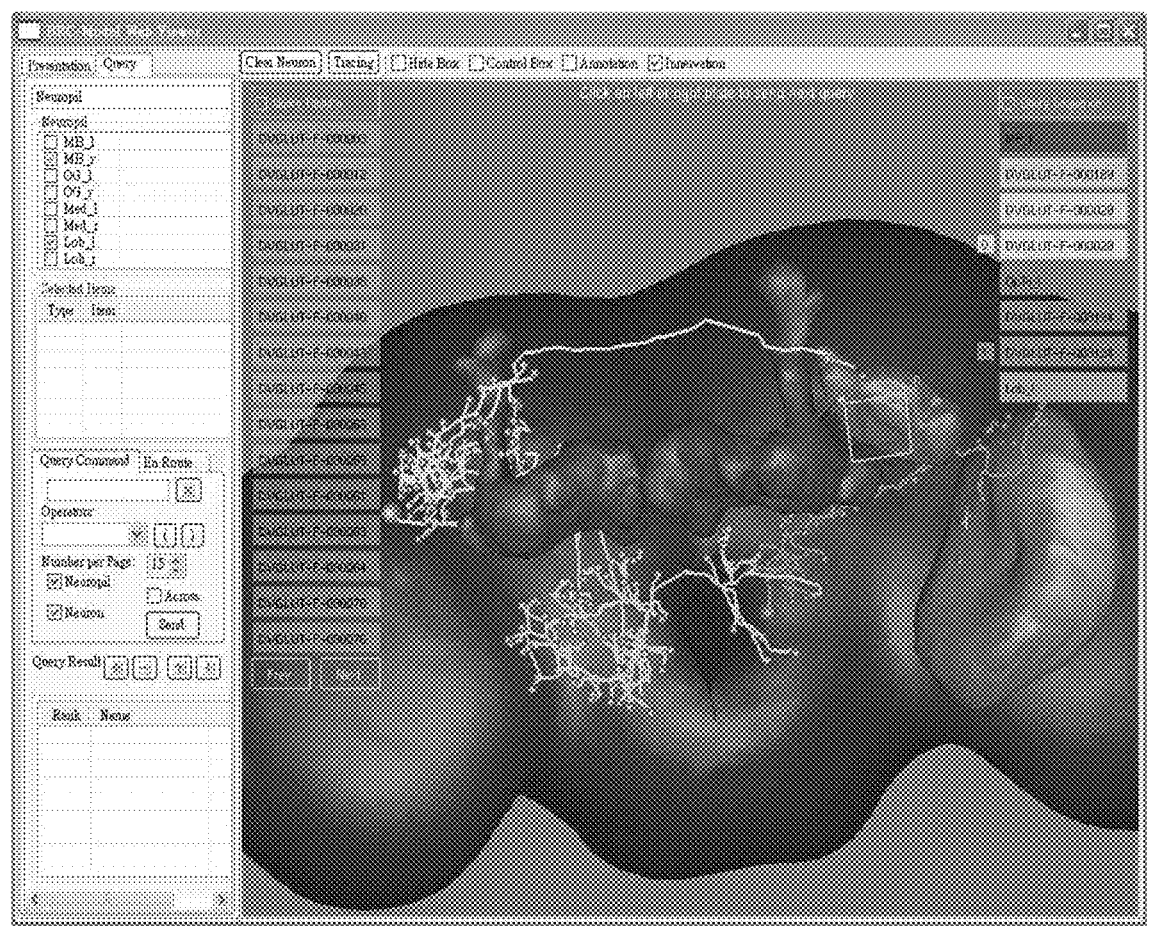
FIG. 4 shows the innervation-query interface, which enables users to build paths of neuron innervations step-by-step. Users can start from one neuron/neuropil and find out the connections of said neuron/neuropil with other neurons/neuropils. The figure illustrates two neurons (DVGLUT-F-000029, lemon yellow and DVGLUT-F-0000189, orange) innervating the mushroom body (MB_r, maroon). DVGLUT-F-000029 neuron is found to connect to a selected box, which occupies the space belonging to another neuropil—optic tubercle (OpTu_1, green). A third neuron (DVGLUT-F-000134, red) is found with its terminals innervating OpTu_1 from the right side. A third neuropil (Lob_1, blue) is found to connect with DVGLUT-F-000134 neuron through its nerve terminals. A column on the left of the visualization interface shows part of neurons also innervating Lob_1.
Figure 5:
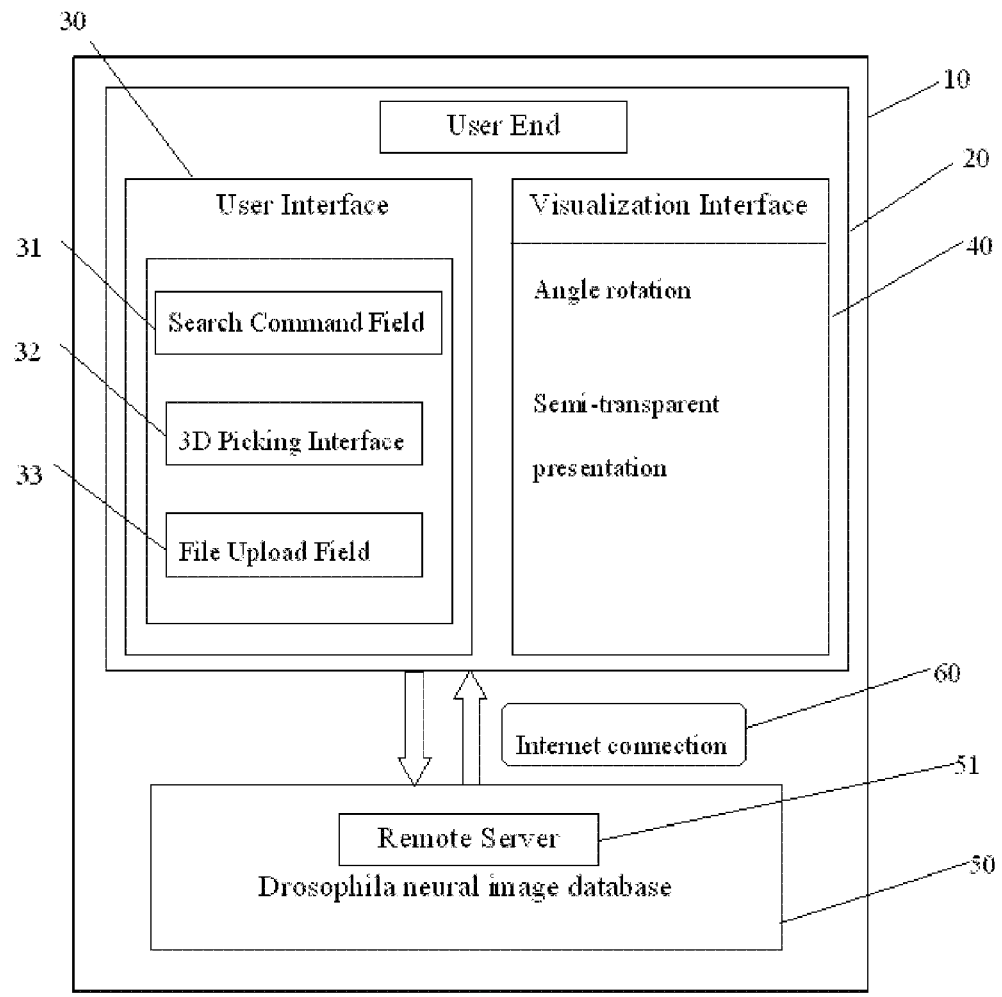
FIG. 5 shows system architecture of the system, which includes the interactive query interface, the visualization interface and the remote image database. Said interactive search device 10 is linked via the internet 60 for data transmission and to automatically search for information in the database 50 designated by the user using search commands. The remote server 51 and query interface 20 are linked via the internet 60, receiving search commands from the user interface 30 and visualization interface 40. The user interface 30 comprises search command field 30, 3D picking interface 32 and file upload field 33.
Figure 6:
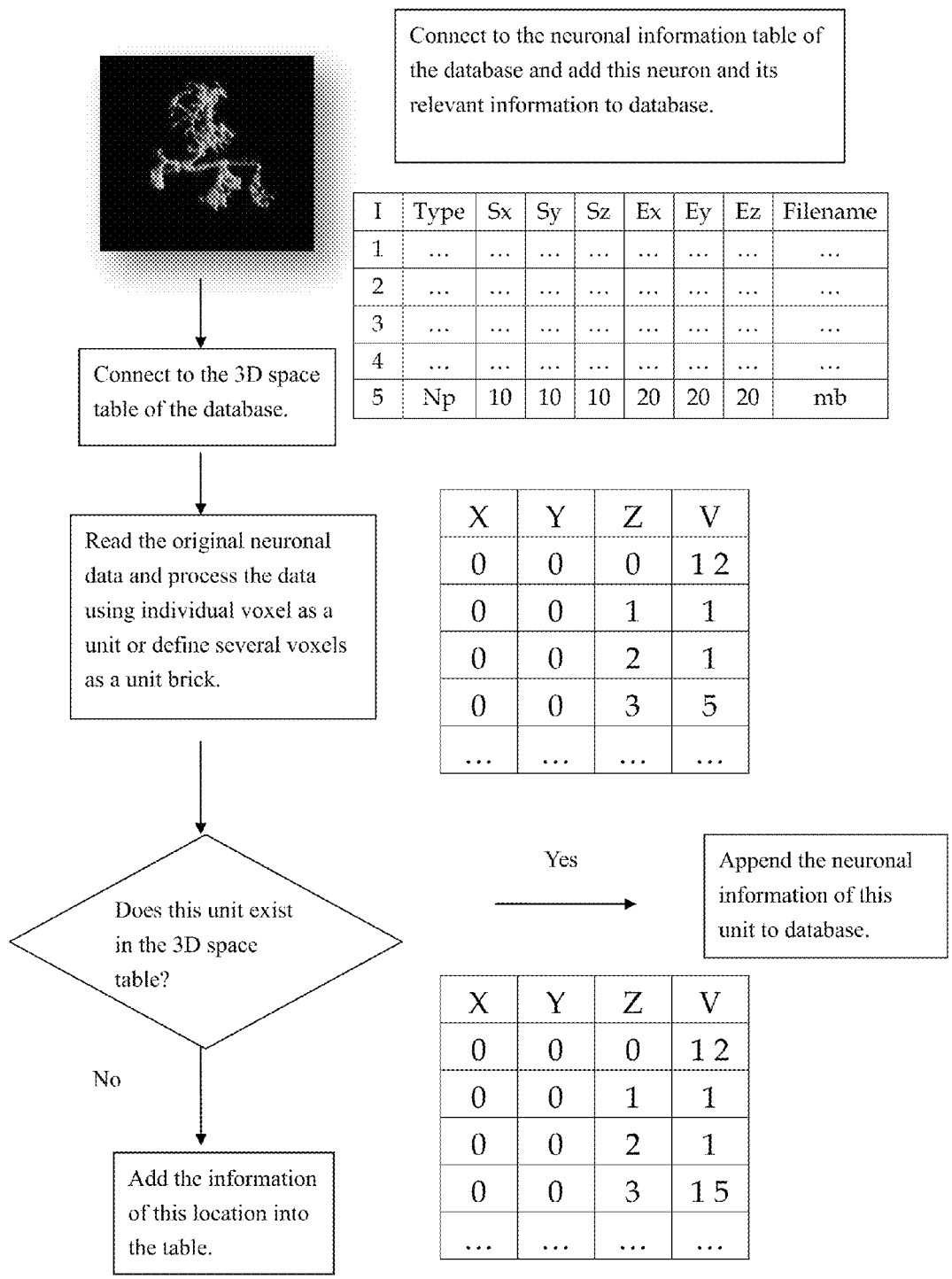
FIG. 6 shows the flow chart of database construction. In the neuronal information table, "I" denotes neuron numbers, "Type" denotes neuron types (e.g. male, female and nerve function area), "Sx, Sy, and Sz" represent the starting coordinates of a particular nerve, "Ex, Ey, and Ez" represent the ending coordinates of the aforesaid neuron, and "Filename" denotes the original file of this neuron. X, Y, Z in the 3D space table represent the coordinate of spatial unit (voxel or brick) in the 3D space, whereas V denotes the number of neuron passing through this particular space unit.
Figure 7:
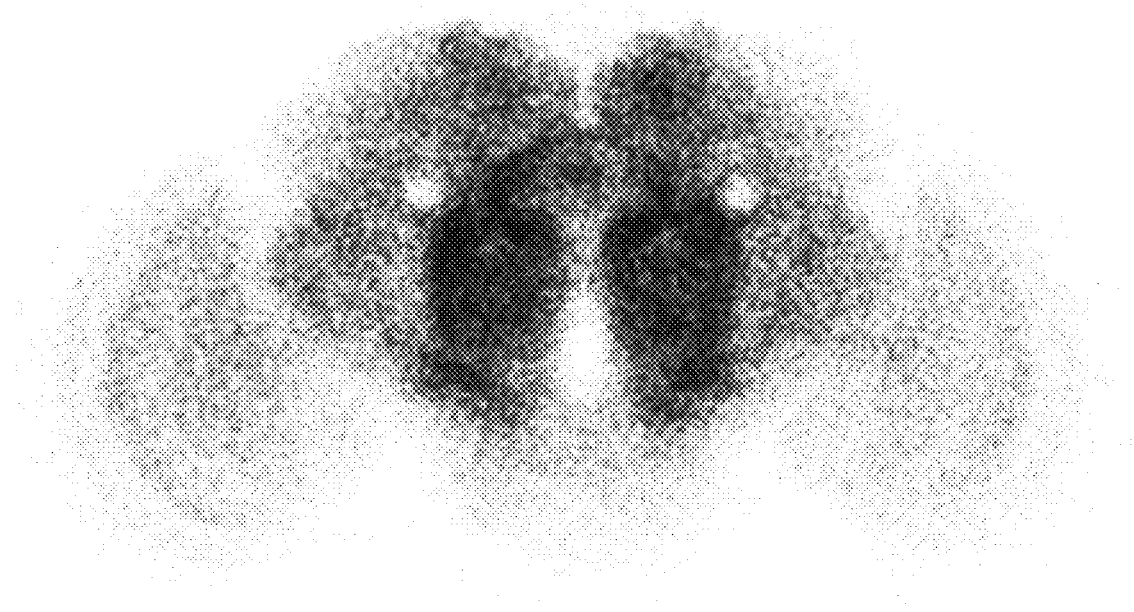
FIG. 7 displays the 3D nerve ending distribution map in gray-scale dot matrix to represent the nerve terminal density in a certain unit space. The spatial location with more gray-scale dots implies denser aggregation of nerve synapses, which infers the area is a neural network hub (neuropil), i.e. an area with more frequent neural signal transmissions. As displayed in this figure, the external outline of the Drosophila brain is observable, suggesting the dot matrix is indeed correlated with neural network functions.

| DESCRIPTION OF MAJOR COMPONENT | |
|---|---|
| 10 | Interactive query device for 3D *Drosophila* neural image database |
| 20 | Query interface |
| 30 | User interface |
| 31 | Search command field |
| 32 | 3D picking interface |
| 33 | File upload field |
| 40 | Visualization interface |
| 50 | 3D *Drosophila* neural image database |
| 51 | Remote server |
| 60 | Internet connections |

What is claimed is:

1. A method for database construction comprising the following steps:
    (a) providing more than one three-dimensional (3D) network motif images;
    (b) aligning and correcting 3D images generated in (a) according to a 3D standardized coordinate, wherein each point registered to the 3D images is assigned a coordinate location (x, y, z) to indicate its position in the standardized space area;
    (c) dividing 3D images in (b) with individual voxel or a self-defined brick consisting various voxels, wherein voxel is a volume element, representing 1×1×1 unit on a regular grid in the standardized space area;
    (d) categorizing space information of each coordinate point registered to the 3D images within voxels;
    (e) storing processed 3D network motif images in (c) and space information in (d) into a computer-readable recording medium; and
    (f) providing skeletal forms of said 3D network motif images processed with path tracing algorithm.

2. The method of claim 1, wherein said 3D network motif images comprises neuronal images include at least one complete neuron.

3. The method of claim 2, wherein said complete neuron further comprises a soma, an axon or dendrites.

4. The method of claim 1, wherein said path tracing algorithm comprises the following steps: selecting any given two points from the 3D network motif images and using the 3D network motif image outline between these points to calculate the curve length s with the following formula:

$$E(C) = \int_\Omega \{\alpha \|C'(S)\|^2 + \beta \|C''(S)\| + \lambda P(C(s))\} ds$$

where $\alpha$, $\beta$, $\lambda$ denote constant positive real numbers, C (s) represents the curve outline of the neuronal image, L in $\Omega=[0, L]$ denotes the length of the curve outline and P (C (s)) represents the best energy area of the image outline determined based on the brightness of the neuronal image selected using the best energy equation.

5. The method of claim 4, wherein said best energy equation refers to a minimum energy action map which is built using the following function:

$$U_{Po}(P) = \inf_{A P o P} E(C) = \inf_{A P o P} \left\{ \int_\Omega \tilde{P}(C(s)) ds \right\}$$

where $U_{Po}$ (P) is defined as the minimum energy of the path between a point Po and P in the image, $Ap_op$ denotes the set of all paths between points Po and P; When the minimum energy action map is built, the shortest path between Po and P is obtained.

6. The method of claim 2, wherein said neuronal images are generated from micro-imaging devices comprising a charged particle scanning microscope, electron scanning microscope, laser scanning microscope, confocal microscope and fluorescent microscope.

7. The method of claim 1, wherein space information within voxels in (d) comprises the location of said voxel and the ID number of images passing through that particular voxel unit.

8. The method of claim 1, wherein steps (e) further comprised storing the information of processed images consisting the types of said images, starting and ending point locations of said images and designate filenames of said images.

9. The method of claim 8, wherein the type of said images consist the gender of the original organism that donated said images, the function of said images or any biological characters that distinguish said images from one another.

10. The method of claim 1, wherein said computer-readable recording medium comprises a magnetic storage device, an optical storage device or an electronic storage device, where said recording medium are situated on a PC and a remote device connected through a transmission system.

11. A method for interactive query of a 3D network database comprising the following steps:
    (a) providing a 3D network motif image database, wherein the 3D network motif image database is used to understand the connection relationship of the 3D network, and constructing an interactive query interface for users;
    (b) selecting at least one spatial region, wherein said spatial region comprises at least one 3D rectangular space, at least one branch path or a Boolean combination of the aforementioned objects, or entering at least one search string in query interface in (a) to search for corresponding images information meeting the query criteria, wherein said corresponding images information meeting the query criteria in database refers to a name of neuron, the characteristics of the neuronal image, and the 3D neuronal image in database as described in (a);
    (c) presenting said resulting images meeting the query criteria in (b) with dot-matrix or image forms with texts on the query interface, wherein a search string comprises the texts of at least one name of the motif image or at least one source of the network motif image or the Boolean operation of above; and
    (d) providing the dot-matrix represents the number of terminals of the neuron path tracing graph in each unit space.

12. The method of claim 11, wherein said network motif image database comprises neuronal image data and spatial information of said neuronal images.

13. The method of claim 11, wherein said query interface provides users with at least one visualization interface and at least one search field.

14. The method of claim 13, wherein said visualization interface further comprises a computer screen, a 3D or non-3D multi-media display and an exhibition space or flat surface for 3D or non-3D projection.

15. The method of claim 13, wherein said visualization interface presents motif images in three-dimension form, while further provides users to rotate and zoom said images at all angles for panoramic view.

16. The method of claim 15, wherein said visualization interface displays motif images in semi-transparent form to illustrate multiple network motif images.

17. The method of claim 11, wherein said query interface automatically identifies the designated criteria by users for data search when the users input a search command.

18. The method of claim 11, wherein said path is consisted of the extension of a first network motif image to at least two other network motif images, where the first network motif image is selected by users.

19. The method of claim 11, wherein said characteristics of the neuronal image comprises the sources of the neuronal image, spatial distribution of the image and the unit space density of the nerve terminals.

20. The method of claim 11, wherein said unit space density of the nerve terminals refers to the representation of the level of density of synapse in a unit space in gray-scale for the prediction of network hubs.

21. The method of claim 11, wherein said corresponding image information meeting the query criteria is further used for searching similar image information in the database and the results are displayed on the query interface.

22. The method of claim 21, wherein the similar image information comprises the information of network images from the same origin organism or from proximate space point locations of the original image in the corresponding search criteria.

* * * * *